Patented Apr. 30, 1929.

1,711,448

UNITED STATES PATENT OFFICE.

ORIN D. CUNNINGHAM, OF INDIANAPOLIS, INDIANA, ASSIGNOR TO PETER REILLY, OF INDIANAPOLIS, INDIANA.

TREATMENT OF TAR.

No Drawing.   Application filed April 27, 1925. Serial No. 26,301.

The present invention relates to the treatment of tars for the production of a material suitable as a substitute for decolorizing carbon, which material after treatment with alkali loses the decolorizing properties but is suitable as a substitute for carbon black, i. e., as a filler in rubber compositions or as a pigment.

The preferred form of execution of the process involves the intimate incorporation of coal tar with sulfuric acid while in a cool condition, and the subsequent heating of the mixture sufficiently to effect sulfonation of the tarry material, which sulfonation should be as complete as possible. Any kind of tars can be used, e. g. tars of mineral (organic) animal or vegetable sources.

As a preferred example, I cite the treatment of a coal tar: 1 part of common coal tar is emulsified with about 5 parts of strong sulfuric acid, at room temperature. If the tar shows a considerable tendency to heat up on mixing with the acid, it is preferable to employ artificial cooling in this step.

The mixture is then heated to about 160 or 170° C., care being taken to prevent excessive foaming, particularly during the early stages and at the end of the treatment.

The sulfonated product is then dumped into a large quantity of water and is washed several times by decantation with water to remove the excess acid. This product can then be dried if desired, but it is preferably not dried beyond the stage of a paste. The water might thereafter be displaced by another solvent, in known manner.

The solid matter in the paste, is a black impalpable powder which can readily be separated from a large bulk of water or aqueous liquids by decantation.

This product has decolorizing properties in this form.

When using this as a decolorizing agent, acid is liberated, (sulfuric acid being a product of the decolorizing reaction). This would be suitable for decolorizing a glucose solution. If the product is treated with an alkali the decolorizing properties are lost, but the product would still be useful as a substitute for carbon black, i. e., as a filler for rubber compositions or as a pigment.

The treatment with alkaline solutions removes a substantial fraction of the product as soluble salts, and converts a considerable portion of the insoluble material into an extremely fine, almost colloidal condition which separates only very slowly from water.

The preferred mode of operation is to treat with alkali while in the presence of a small amount only of water, after which it may be concentrated to the stage of a paste. The water in this paste may be displaced by organic solvents, in the well known manner.

The product after the alkali treatment, while in the form of a paste, is very smooth and fine textured and can be spread as a smooth adherent film on paper or other like surface.

Reference was made above to the possibility of drying the product from the sulfonation and washing process. It is better to use it in the paste form. Generally drying causes the product to set to a cake which is too hard to crush between the fingers and is difficult to grind to its original state of fineness.

In mixing the acid with the tar, it is important that the mixing be effected cold and that the mixing be thorough to produce satisfactory results. If the mixing is conducted hot, a gummy mass is likely to be produced, which cannot be completely incorporated with the acid.

Other tars will be treated in substantially the same manner as above.

I claim:—

1. That method of treating tar for the production of a material suitable as a base to be employed as a filler or pigment or for decolorizing material which comprises admixing tar with more than its own weight of cold sulphuric acid, and thereafter heating the mixture to effect sulphonation.

2. That method of treating coal tar for the production of a material suitable as a base to be employed as a filler or pigment or for decolorizing material which consists in admixing coal tar with cold sulphuric acid, heating the mixture to effect sulphonation, and thereafter running the sulphonated mass into a body of water.

3. That method of treating coal tar for the production of a material suitable as a base to be employed as a filler or pigment or for decolorizing material which consists in admixing tar with cold sulphuric acid, heating the mixture to effect sulphonation, thereafter running the sulphonated mass into a body of water, separating the mass, and subjecting the mass to a washing action.

4. That method of treating coal tar for the production of a material suitable to be employed as a filler or pigment which consists in admixing coal tar with cold sulphuric acid; heating the admixture until sulphonation is effected; washing the mass and neutralizing the same.

5. In the art of treating tar, the herein described step which comprises thoroughly mixing tar with several times its own weight of strong sulfuric acid and thereafter heating until sulfonation is effected.

6. Completely sulfonated tar.

7. Completely sulfonated coal tar.

8. Sulfonated tar having decolorizing properties.

9. Sulfonated tar having decolorizing properties which are lost in treatment with alkali.

In testimony whereof I have signed my name to this specification.

ORIN D. CUNNINGHAM.